United States Patent [19]
Bradeen et al.

[11] Patent Number: 5,975,342
[45] Date of Patent: Nov. 2, 1999

[54] LARGE MUG AND BEVERAGE CONTAINER HOLDER

[75] Inventors: Stephen E. Bradeen, 330 Pinedale Ave., Sacramento, Calif. 95838; Anne Bradeen, Sacramento, Calif.

[73] Assignees: Stephen E. Bradeen; Anne K. Bradeen, both of Sacramento, Calif.

[21] Appl. No.: 08/825,345

[22] Filed: Mar. 28, 1997

[51] Int. Cl.[6] .................................................. B65D 25/24
[52] U.S. Cl. ........................ 220/737; 224/926; 248/311.2; 217/65
[58] Field of Search ........................... 220/737; 224/926; 248/311.2, 205.2, 205.3; 217/17, 65, 96

[56] References Cited

U.S. PATENT DOCUMENTS

| | | | |
|---|---|---|---|
| 1,152,366 | 8/1915 | Backus | 217/65 |
| 3,193,886 | 7/1965 | Wenger et al. | 217/65 |
| 4,681,219 | 7/1987 | Kitchens | 224/926 |
| 4,821,931 | 4/1989 | Johnson | 224/926 |
| 5,018,633 | 5/1991 | Toth et al. | 248/311.2 |
| 5,205,452 | 4/1993 | Mankey | 224/926 |

*Primary Examiner*—Stephen Castellano

[57] ABSTRACT

Mugly is a support system for large size mugs and sports bottles for use specifically, but not exclusively, in large freight vehicles where it can be placed on the floor within reach of the driver. It is made of wood, has a 17 degree truncated shape (12, 16), on inside circular opening, (11), an opening in the front to accomodate the handle of a mug (10), and a 5 degree cut in both side pieces which allow them to rest flush against the front and back pieces (20). It is strenghtened with brads and wood glue to provide durable, drop-resistant joints. A non-slip product available commercially is affixed to the bottom.

1 Claim, 6 Drawing Sheets

Composite View

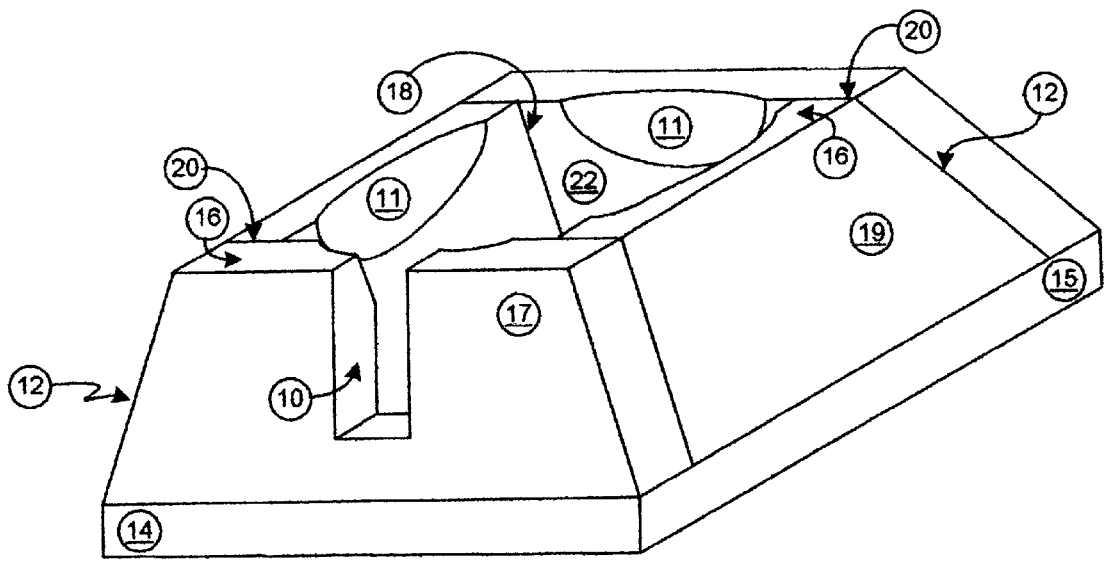
Figure 1 - Composite View

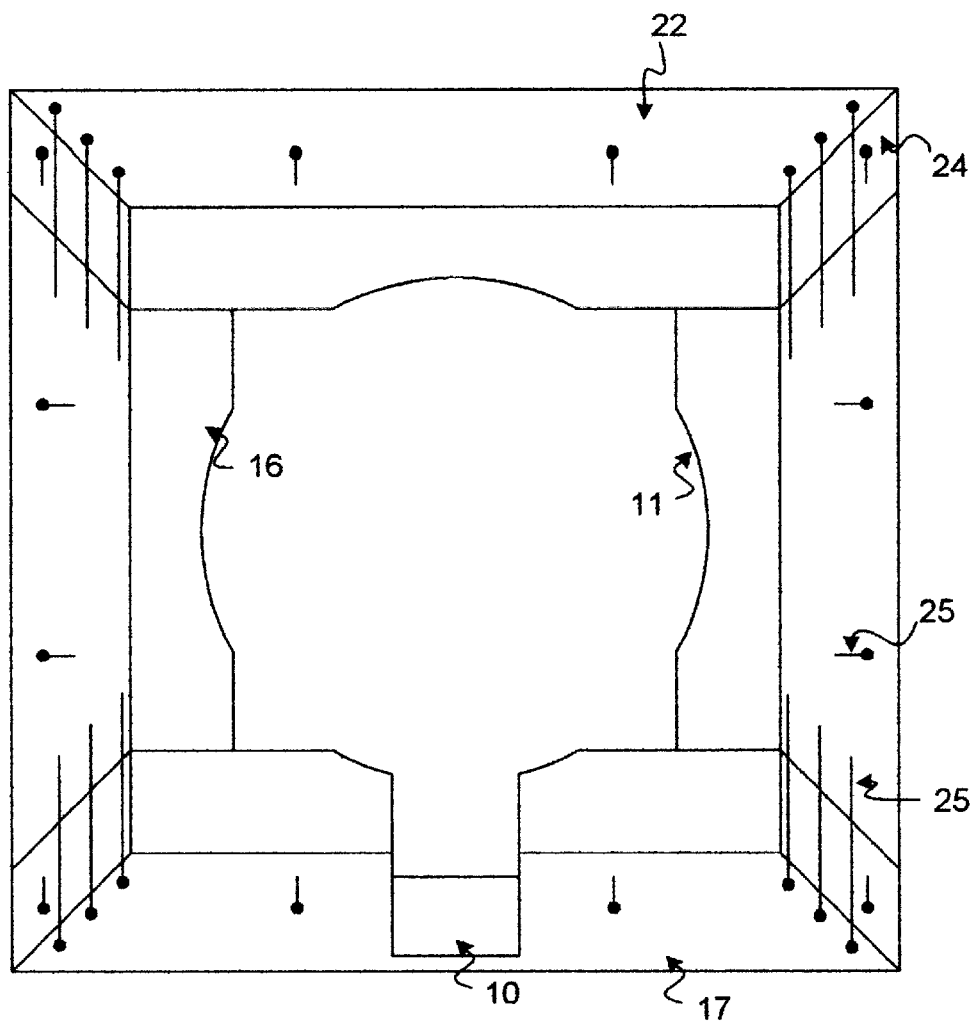
Figure 2 - Top View

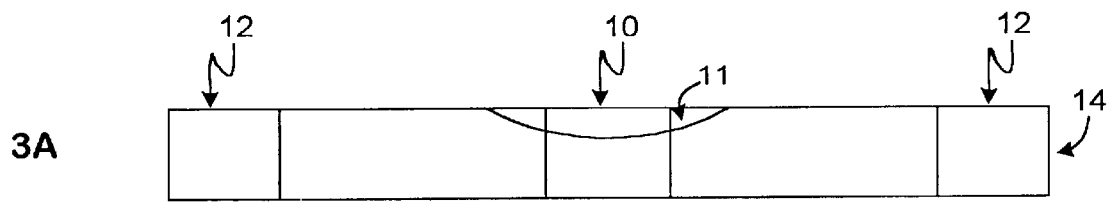
3A
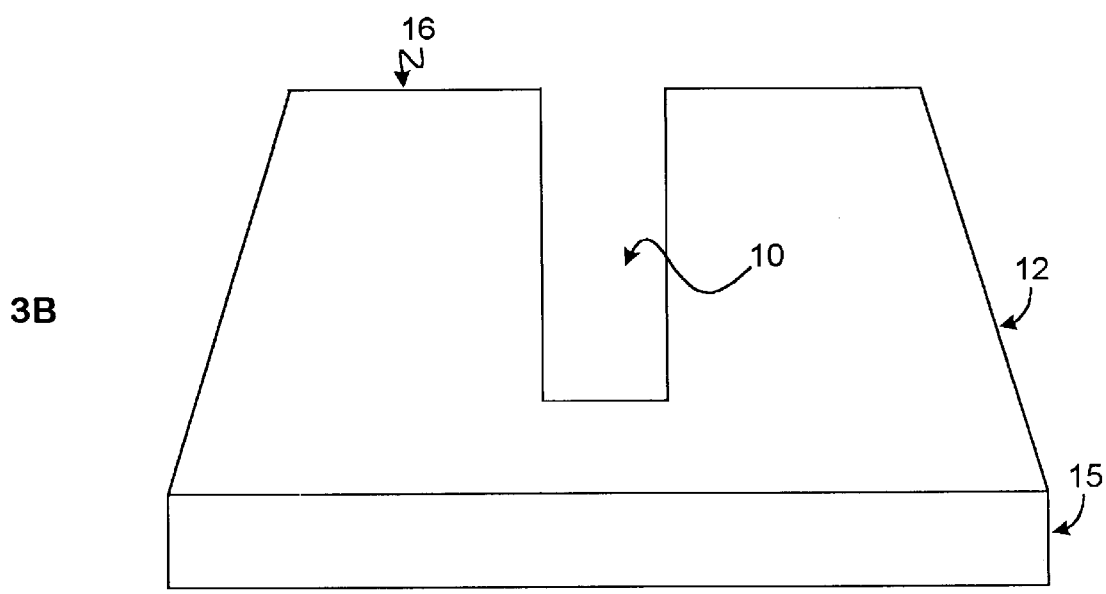
3B
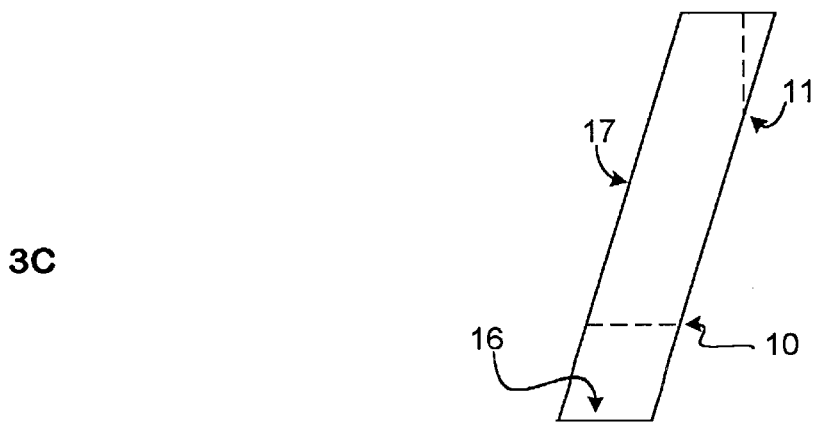
3C
Figure 3 - Front View

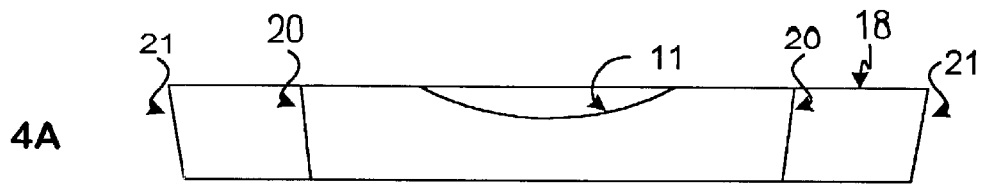
4A
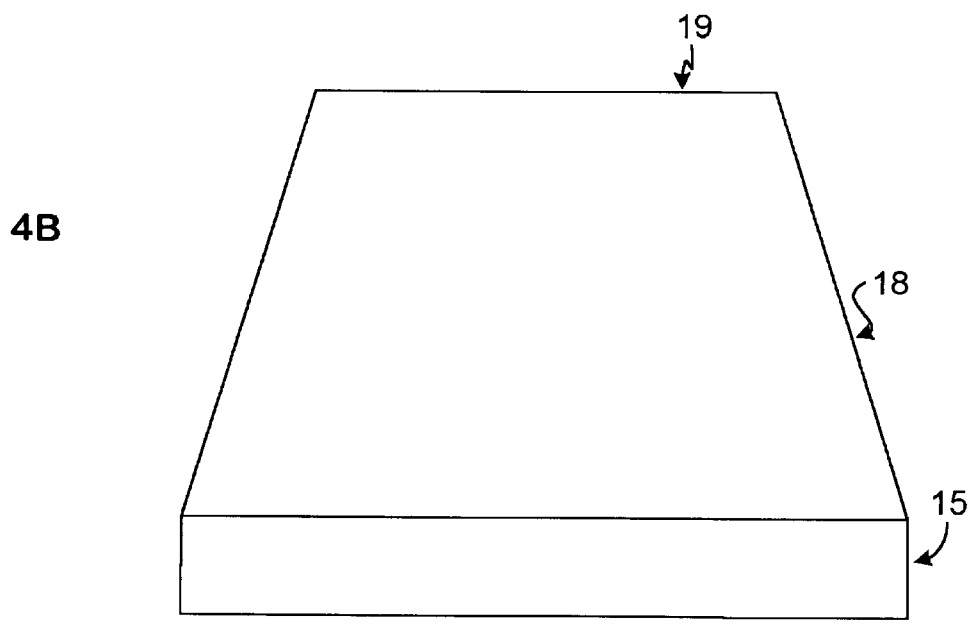
4B
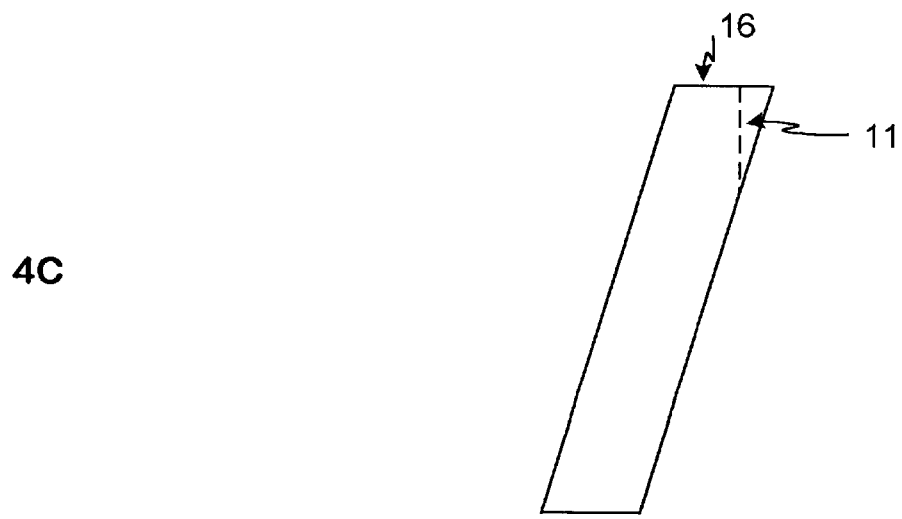
4C
Figure 4 - Right and Left Sides

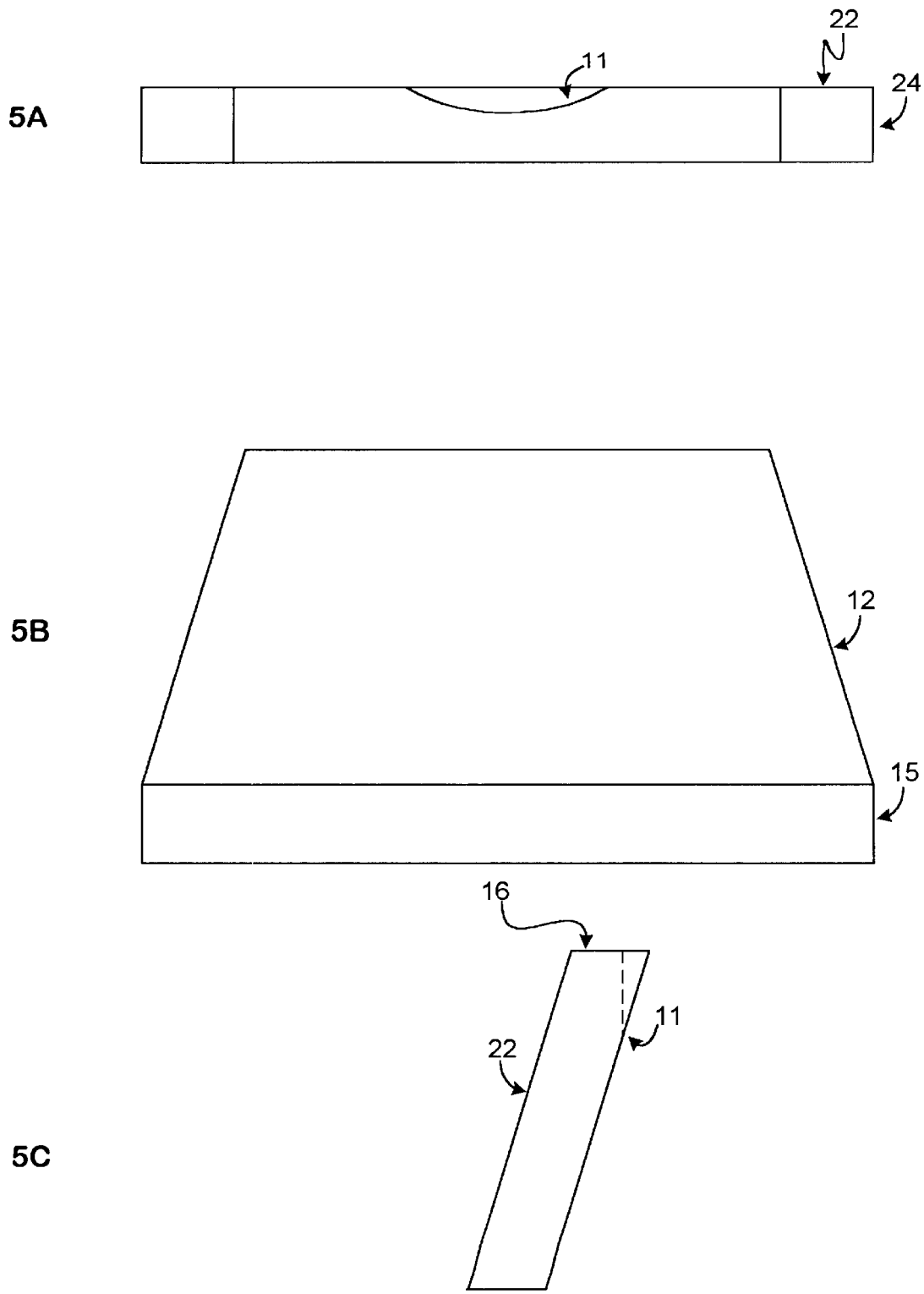
Figure 5 - Back View

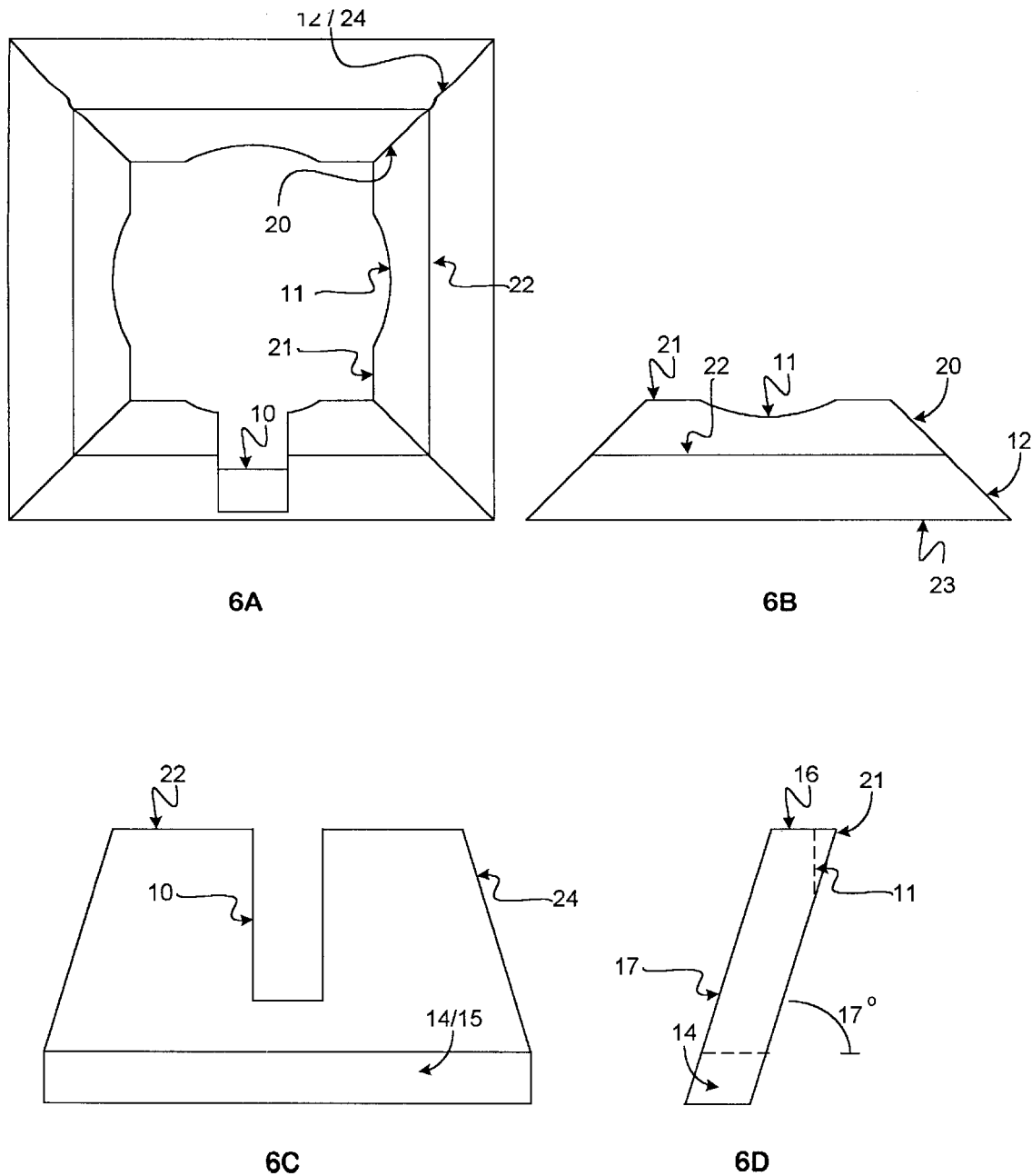
Figure 6 - Multi view

LARGE MUG AND BEVERAGE CONTAINER HOLDER

BACKGROUND OF THE INVENTION

1. Field of Invention

This invention relates to supporting a large insulated mug 20 oz. to 32 oz., sports bottle, or similar drink container so that it does not spill in moving vehicles such as commercial trucks, automobiles, airliners, or ships,

2. Description of Prior Art

Heretofore holders for beverage containers of various sorts have been in use and have increased in their sophistication to the point that now various types of beverage holders are easily distinguishable by their specialized features that adapt them for particular uses in motor vehicles. My invention provides a simple and convenient member of this class of beverage holder.

Holders for support of beverage containers in vehicles must generally be supported on the vehicle structure so that they maintain positional stability when the forces generated by normal vehicular activity are applied to the holders and their fluid contents. This requires that the holder itself must be positionally maintained on some part of the interior surface of a vehicle, preferably in a releasable fashion, and also that the beverage container must be maintained in the holder to prevent container motion or spilling. Additionally, such a holder must be adaptable to beverage containers of various sizes and shapes as well as to vehicles of various kinds and styles. Prior art devices have not addressed or solved these problems as well as the simple and convenient style of my invention. Other prior art devices use a multitude of attachment methods which negate the portability and utility of my invention for use in various other vehicles and modes of transportation.

Heretofore, drink cup holders have been unable to accommodate the large sized containers in an efficient manner to prevent spilling. Large sized containers have also been very difficult to manage in large commercial vehicles such as vans, pickup trucks and 18 wheelers where engine vibration and poor suspension may cause frequent spillage.

SUMMARY OF THE INVENTION

To maintain beverage containers of various sizes and shapes in various types of vehicles and nodes of transportation in a simple and convenient way, my wooden holder provides a flat, pyramid-shaped base with a non-slip surface on the bottom which makes the invention suitable for use on carpeted or non-carpeted surfaces.

Accordingly several objects and advantages are met with my invention:

It is an object of the invention to support a large, insulated mug or sports bottle in the truck cab of a large commercial vehicle.

It is an object of the invention to be easily portable from one vehicle or mode of transportation to another.

It is an advantage of the invention to be impervious to dirt and grime.

It is an advantage of the invention that the handle opening can be positioned in any direction to accommodate certain physical disabilities of the hand, wrist, or forearm.

It is an advantage of the invention that it does not require installation.

It is an advantage of the invention to be durable and not easily broken if dropped.

It is an advantage of the invention to support a wide variety of drink containers of various sizes and shapes.

It is an advantage of the invention to be of use in transportation modes and situations other than truck cab. Further objects and advantages of my invention will become apparent from a consideration of the drawings and ensuing description of it.

DESCRIPTION OF DRAWING FIGURES

FIG. I shows a perspective of Mugly at a 30 degree angle. This picture show Mugly's wide base and narrower top which prevent the mug or sports bottle from toppling over due to the higher center of gravity.

FIG. II shows a perspective of Mugly from above. It can be seen how the sides are tapered and the cut out of 4¼ inches to accommodate large 32 oz. mugs and a 4 inch cut out for 20 oz. mugs. Also shown are the points at which brads are strategically place in combination with wood glue for durable, drop-resistant joints.

FIG. III shows a view of Mugly's front piece from three directions, A, B, and C.
- A. is a top view showing the circular cut, #11, inside the Mugly.
- B. is a frontal perspective which shows the cut out, #10, for the handle of a mug. This also shows the taper of the sides, #12. Also shown is the base which supports the sides, #15.
- C. is a perspective of the front showing that a 17 degree parallel cut is at the top and bottom of the face which allows for the pyramid shape.

FIG. IV is a perspective of the right and left sides of the mug support system with 3 drawings, A, B, and C.
- A. is a view from the top of a side to show:
  1.) the inside circular cut, #11
  2.) the 5 degree angle cuts, #20 and #21, the cut peculiar to my invention which allows the front and back pieces to rest flush against the sides to eliminate the need for wood putty filler.
- B. is a perspective of the sides at eye level which shows that the sides are identical to each other.
- C. is a view of the sides from a side angle. Notice the 17 degree top and bottom cuts to give the pyramid shape, #16.

FIG. V consists of views A, B, and C of the back.
- A. pictures the back from an overhead view showing the inside circular cut, #11.
- B. pictures the back at eye level. Notice the 17 degree bevel at the sides, and that the front and back are identical to each other except for the opening in the front for a mug handle.
- C. views the back from the side. Note the inside circular cut. The 17 degree bevel at the top and bottom of the back piece which allows for the pyramid shape. Also, note the 1¼ inch brad penetrating from the bottom of the base into the back piece. It is at this point that wood glue is used on all joints with the brads for extra strength.

FIG. VI is a drawing of my original Mugly to show how the current design evolved. Notice that all four corners are beveled. This design was more time consuming to make and assemble.

MUGLY SUPPORT SYSTEM SPECIFICATIONS AND REFERENCE NUMERALS

My Mugly is made from wood which is stained or painted and finished with shellac to seal and protect it. A non-slip product purchased commercially for use under throw rugs and in recreation vehical cupboards to prevent dishes from sliding is affixed to the bottom.

10 Opening for Mug handle 2½ inches deep by 1 inch wide.
11 Circular cut inside mug. Currently I make two sizes: 4 inch circular cut to accommodate a 20 oz. mug or smaller, and a 4¼ inch cut to accommodate a 32 oz. mug.
12 Ends cut at 17 degrees base to top.
14 Base of Mugly front.
15 Base 7 inches by 7 inches by ¾ inches.
16 Top of Mugly cut 17 degrees inside to outside.
17 Outside of Mugly front 7 inches by 3⅜ inches by ¾ inches.
18 Ends are cut 17 degrees base to top.
19 Right and left sides are 5½ inches by 3⅜ inches by ¾ inches.
20 Ends are cut to 5 degrees from inside to outside.
21 Base.
22 Back is 7 inches by 3⅜ inches by ¾ inches.
23 Base of back.
24 Ends are cut 17 degree base to top.
25 1¼ inch brads.
26 46 degree angle in FIG. VI of the original Mugly.
Note: All angles except #s 20–21 are 17 degrees. Bottom has non-slip commercially available product affixed with adhesive and staples.

MUGLY DESCRIPTION AND FABRICATION

Mugly is fabricated from wood and consists of a front piece FIG. III, two sides FIG. IV, a back FIG. V, and a bottom FIGS. I and II.

Mugly is made from pine wood, but harder, more attractive woods such as cedar, oak or maple can be used for a more attractive finished product.

Use 1 inch by 8 inch pine for the base, FIG. V. Cut the base 7 inches by 7 inches.

Use 1 inch by 4 inch pine for each side, FIG. IV. Cut these pieces 5½ inches long.

Use 1 inch by 4 inch pine for the front, FIG. III, and the back FIG. V. Cut these pieces 7 inches long.

Rip 17 degree parallel angles along the top and bottom of the sides FIG. IV, view C. Sides are now 3⅜ inches wide.

Rip 17 degree parallel angles along the top and bottom of the front, FIGS. III view C, and back FIG. V view C. Front, back are now 3⅜ inches wide.

Cut a 2½ inch by 1 inch slot in the front piece for the mug handle, FIG. III, #10.

Cut the ends of the front and back 17 degrees starting from the base and ending at the top. See FIG. III and FIG. IV, view B, # 12.

Cut a 5 degree bevel at the ends of the sides, FIG. IV, view A # 20 and #21. This 5 degree bevel allows the sides to fit the front and back snug as they rest against one another Sand the inside wall of all pieces with fine sandpaper. Stain only the inside walls (or paint the inside walls after using an undercoat).

Using a water resistant glue and 1¼ inch brads, glue and nail all joining pieces, see FIG. II, #25. Countersink all brads. Use wood putty where needed over brads, cracks, etc.

Make a circular template of diameter 4¼ inches for 32 oz. mugs and of 4 inch diameter for 20 oz mugs.

After stain (or paint) and wood putty dries, lay the template over the top of the Mugly and outline a circle. Cut a circular orifice in the top opening with a short saber saw blade, see FIG. II #11. Do not cut into the base of the Mugly, only through the walls to give the flat, supportive surface for a mug.

Sand the inside orifice and outside of the Mugly. Finish sanding with a fine grit sandpaper.

After sanding, stain (or undercoat and paint) the Mugly.

After drying, treat stained wood inside and out with spray-type shellac.

Using an adhesive and staples, secure a non-skid fabric to the bottom of the Mugly.

We claim a beverage container holder comprising:

1. A wooden beverage container holder for supporting mugs and sports bottles of up to 32 ounce capacity comprising:

a rectangular, flat wooden bottom and four generally upstanding sidewalls made from separately cut flat wooden panels, each sidewall is aligned with the periphery of the rectangular bottom, each sidewall is angled inwardly and upwardly and the holder generally defines the shape of a truncated pyramid when viewed in perspective, each sidewall is wider adjacent to the bottom and narrower adjacent its top edge to make holder heavier near the bottom and less susceptible to tipping, the sidewalls are joined such that the side edges of at least one of the sidewalls abuts its two adjacent sidewalls and forms a smooth union with no gaps at the juncture of one sidewall to an adjacent sidewall, the sidewalls and bottom are fastened to each other with metal brads and adhesive, the inside surface of each sidewall includes a concave cut to define a generally circular top opening in the holder to accommodate a cylindrical sidewall of a beverage containers to be placed therein, one of the sidewalls including a notch extending downwardly from the top edge to accommodate the handle of a beverage container, a non-skid material is applied to the underside of the bottom to prevent the holder from sliding.

* * * * *